Aug. 1, 1961 J. C. TRAVILLA 2,994,284
RAILWAY MOTOR TRUCK
Filed Nov. 20, 1958 2 Sheets-Sheet 2
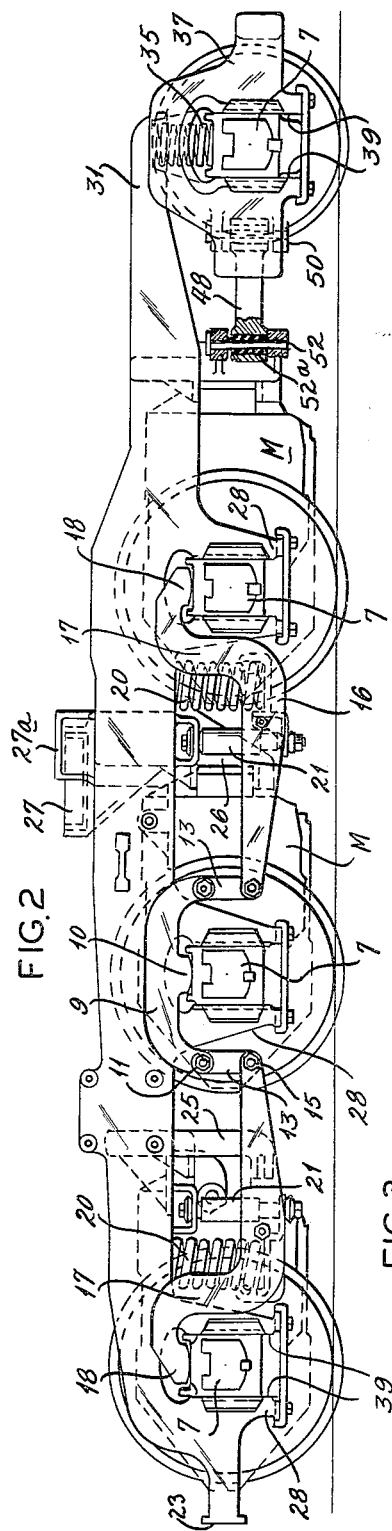
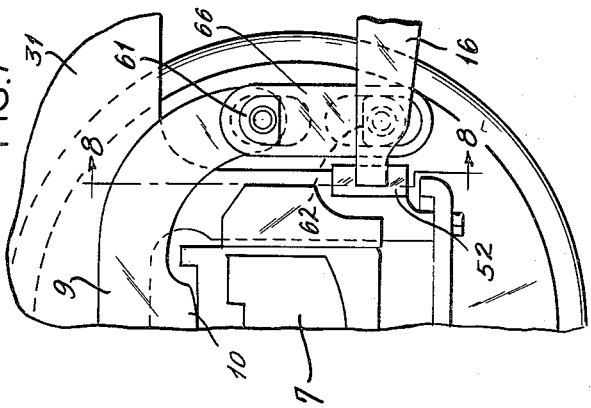
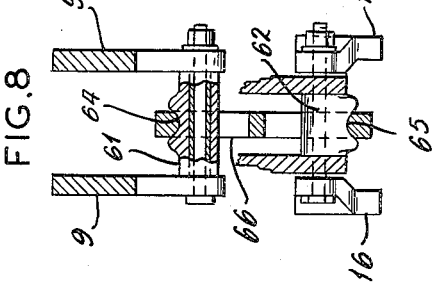
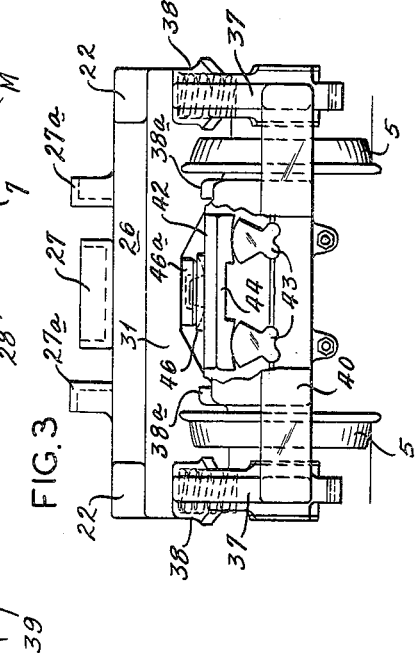
INVENTOR:
JAMES C. TRAVILLA
By Francis T. Burgess
ATTORNEY

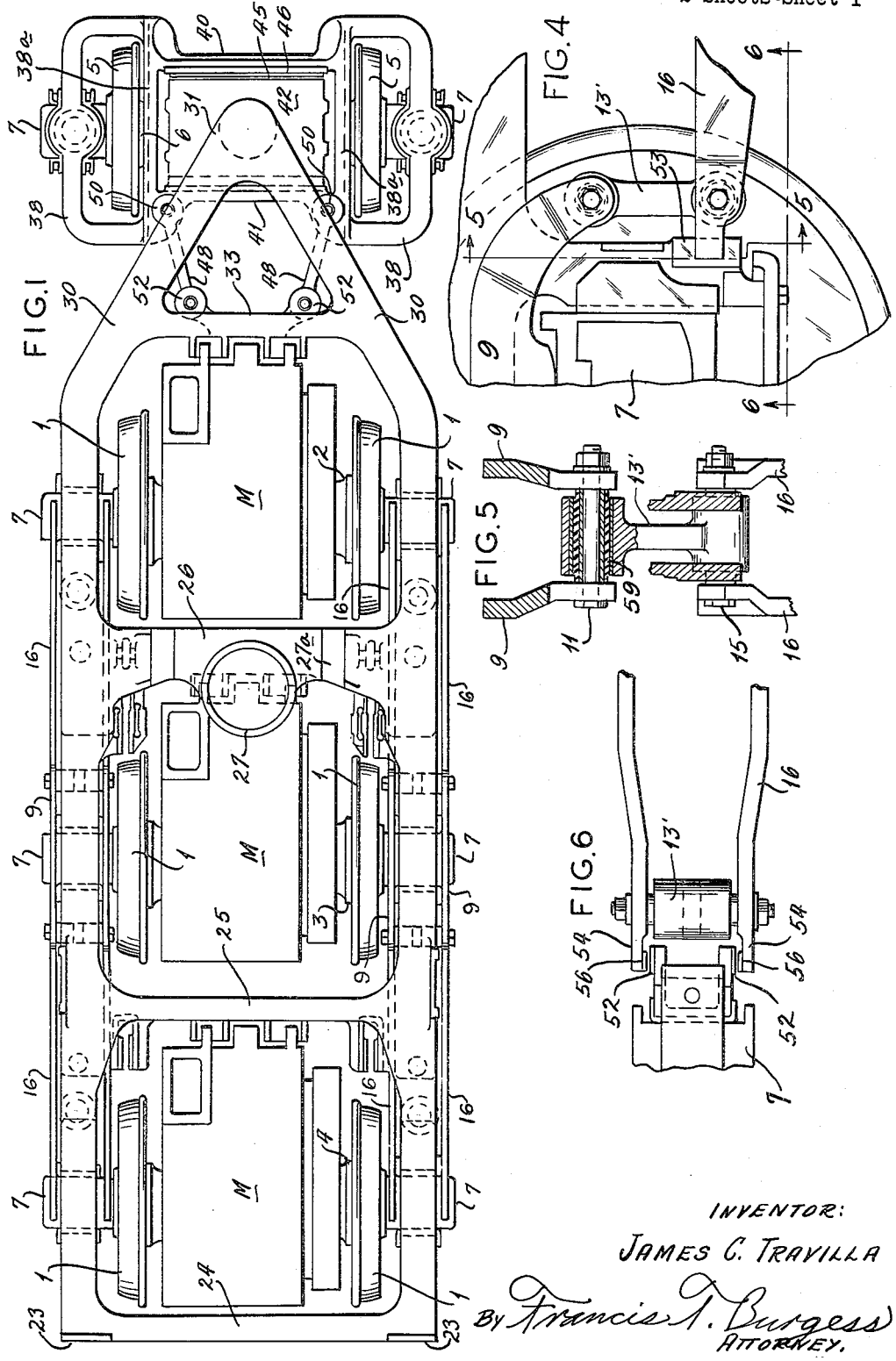

2,994,284
RAILWAY MOTOR TRUCK
James C. Travilla, Ladue, Mo., assignor to General Steel Castings Corporation, Granite City, Ill., a corporation of Delaware
Filed Nov. 20, 1958, Ser. No. 775,189
15 Claims. (Cl. 105—174)

The invention relates to railway motor trucks and consists particularly in a truck having three driving axles and a radially-movable idler axle, with the frame supported from the driving axles by a novel equalization arrangement.

In conventional motor trucks for electric and diesel-electric locomotives, two or more driving axles are provided, in one rigid frame. On long rigid wheel base trucks, during operation on track having relatively short radius curves, the flange of the outside leading wheel tends to climb the rail with consequent danger of derailment and excessive wear on the inside of the rail head.

To overcome the above described condition, I have provided a truck having a rigid frame supported through a novel equalization system on three driving axles and additionally supported at its forward end on a single axle sub-truck connected to the main truck frame for radial movement with respect thereto, so that upon entering a curved track section the leading axle will be caused to assume a position substantially radial with respect to the track curve and will, through its connections to the main truck frame, guide the latter so as to reduce the lateral pressure on the rail of the flange of the outside forward driving wheel. It is intended that a locomotive cab will be pivotally supported on a pair of these trucks arranged in back-to-back relationship under the supported locomotive cab and it will be understood that when so used the trucks will be connected by an inter-bogie control means of a type well-known in the art, whereby to properly guide the trailing truck during its reverse operation.

Accordingly it is an object of this invention to provide a truck having three driving axles on a rigid wheel base in which tracking will be improved and rail wear will be minimized.

It is a further object to provide such a truck embodying a leading radial sub-truck with a single idler axle for causing a reduction in the tendencies of the leading wheel flanges to climb the rail head on curves.

It is a further object to provide an improved radial connection between the sub-truck and the main truck frame in a truck in which all the motors are supported from the frame transoms forwardly of their associated axles.

It is a further object to provide a novel load equalization system associated with the three driving axles and employing coil springs as the sole resilient means whereby substantially constant load distribution may be effected to all the axles of the truck, including the idler axle, notwithstanding track irregularities.

Other detailed objects of the invention will be apparent from the following description, reference being had to the accompanying drawings, in which:

FIGURE 1 is a plan view of a truck embodying the invention.

FIGURE 2 is a side elevation view of the same truck.

FIGURE 3 is a front end view, partially sectionalized, of the truck.

FIGURE 4 is an enlarged fragmentary side view of a modified form of the middle pedestal leg and the associated equalizer parts.

FIGURE 5 is a transverse vertical sectional view along the lines 5—5 of FIGURE 4.

FIGURE 6 is a bottom view along the line 6—6 of FIGURE 4.

FIGURE 7 is a view corresponding to FIGURE 4, but showing another form of equalizer link.

FIGURE 8 is a transverse vertical sectional view along the line 8—8 of FIGURE 7.

The truck comprises six driving wheels 1 mounted in pairs on leading driving axle 2, middle driving axle 3, and rear driving axle 4, respectively, and an idler wheel and axle assembly comprising wheels 5 and axle 6, located forwardly of leading driving axle 2. Journal boxes 7 are rotatably mounted on the ends of each of the axles, and the journal boxes on the driving axles 2, 3, and 4 support a novel equalization arrangement on each side of the truck.

As best seen in FIGURE 2, the equalization system comprises a laterally-spaced pair of longitudinally-extending yokes 9 having a depending downwardly-facing bearing portion 10 curved about an axis extending transversely of the truck and rockably seated on top of each of the middle axle journal boxes 7, and mounting at each of its ends, on transversely extending pivots 11, substantially vertical pendent links 13. Pivotally-supported from the lower ends of links 13, also on transverse pivot axes 15, are end portions of gooseneck equalizing beams 16, which extend longitudinally substantially horizontally in opposite directions from the middle axle and terminate in upright portions 17, the rebent terminals 18 of which are seated on the end axle journal boxes. Adjacent the end axle journal boxes, members 16 carry upright coil springs 20 on which are supported longitudinally-extending side members 22 of a rigid truck frame including an end transom 24 adjacent to and rearwardly of rear axle 4, an intermediate transom 25 between axles 4 and 3, and a second intermediate transom 26 between axles 3 and 2. Adjacent its ends transom 24 is provided with flat pads 23 for connection to an inter-bogie control device of a type well-known in the art. Transom 26 mounts an upwardly facing pivot center plate 27 for pivotally supporting a locomotive underframe, and the usual side bearings 27a. Frame side members 22 are provided with the usual depending longitudinally-spaced pairs of pedestal legs 28, between each pair of which are vertically slidably received journal boxes 7.

For damping the action of springs 20, a friction snubber 21 of a type well-known in the art is connected to each of the equalizers 16 and to the wheelpieces 22 adjacent springs 20.

By providing this equalization system instead of the conventional equalization system in which the middle axle is connected to each of the end axles by a rigid equalizing beam, the vertical movement of one of the end axles due to a track irregularity will not cause unequal distribution of load to the axles as would be the case in a conventionally equalized truck, because, in the present arrangement, if, for example, one of the end wheels is lifted by a high spot in the track, the adjacent spring seat will be lifted slightly by the associated equalizer 16, but will also act as a fulcrum for the associated equalizer, and the end of the equalizer adjacent the middle axle will cause a downward movement of the associated end of yoke 9, with a corresponding upward movement of the opposite end of yoke 9, and of the other equalizer 16 supported therefrom, with the opposite end axle as a fulcrum, thus causing a corresponding lifting of the spring seat on the second equalizer. Since both spring seats at each side of the truck are raised, or lowered, corresponding amounts when any of the wheels is raised or lowered individually, substantially constant distribution of load to the axles will be achieved.

Slightly forward of forward driving axle 2, frame side members 22 are bent inwardly as at 30, converging on the longitudinal center line of the truck as at 31 and being connected between their point of convergence and adjacent driving axle 2 by a fourth transverse transom member 33, the end portion of the truck thus assuming an A-shaped configuration in plan.

Driving axles 2, 3 and 4 are driven by traction motors M which are each supported at one end on their driving axle and at their other end from transoms 25, 26, and 33, respectively.

A coil spring 35 is seated on each of the journal boxes 7 of idler axle 6 and supports a sub-frame 37 comprising outboard side members 38 including longitudinally-spaced vertical pedestal legs 39, between which journal boxes 7 are vertically slidably received, and inboard side members 38a. The opposite side members are connected by transverse members 40 and 41, which support a bolster 42, through a rocker centering device of a type well-known in the art, including transversely and longitudinally-spaced rockers 43 seated on bearings carried by members 40 and 41, and supporting bolster 42 through the usual rocker bearings 44. It will be understood that other types of centering devices well-known in the art may be used with equal effectiveness in this arrangement. The bolster and frame are restrained against relative movement longitudinally of the truck by co-operating frictionally-engaging wear plates 45 and 46 on the bolster and frame members 41 and 42, respectively, and against excessive lateral movement by the engagement of the bolster ends with the sub-frame inboard side members 38a. Bolster 42 supports the forward end 31 of the main frame by means of a spherical center plate 46 on the bolster and a mating center plate 46a at 31, on the main frame.

Sub-frame transverse member 41 is connected at 50 by means of substantially horizontal longitudinally-elongated guiding links 48 to main truck frame transom 33 at 52, links 48 being inclined transversely inwardly from their connections to the sub-frame transom 41, to their connections with the main truck frame transom 33, so that upon entering a curved track portion, with the center of the forward end of the main truck frame directed outwardly of the track center line by the driving wheels, and with axle 6 centered transversely of the track by the engagement of the flanges of its wheels 5 with the track, the outer link 48 will extend the distance, longitudinally of the truck between its pivot connections 50 and 52, of links 48 are vertically elongated. These responding distance, until the leading truck axle coincides substantially with a radius of the track curvature. In order to assist in maintaining the leading truck frame substantially upright at all times, the pivot connections 50 and 52, of links 48 are vertically elongated. These pivots include rubber bushings 52a in order to accommodate slight angling in vertical planes of the sub-frame relative to the main frame.

In trucks having six or more driving axles, it is frequently necessary to provide for lateral movement of the middle axle in order to accommodate the truck to curved track. Such movement is frequently accommodated by providing laterally narrow pedestal legs at the middle axle, thus leaving lateral spaces between the laterally-facing surfaces of the pedestal legs and the co-operating journal box flanges, as may be seen in FIGURE 6. To accommodate such lateral movement of the middle axle journal boxes without disrupting the operation of the equalizers, the construction of the equalizers and the associated middle axle pedestals may be modified as shown in detail views, FIGURES 4, 5, and 6.

In this modification, the pedestal legs at the middle axle, instead of having their outer edges inclined, have them vertically disposed, as best seen in FIGURE 4, and they are provided with transversely inwardly and outwardly facing vertical wear plates 53; the horizontal legs of equalizers 16 are extended as at 54 to overlap the adjacent portions of the pedestal and they are provided with wear plates 56 adapted for vertical slidable engagement with the co-operating wear plates 53 on the adjacent pedestal legs. The arrangement just described will retain the equalizers 16 against substantial lateral movement relative to the truck frame. Yokes 9, however, are enabled to move laterally relative to the truck frame with the middle axle journal boxes 7, on which they are supported. To accommodate such relative movement between the yokes and the equalizers, the links 13' are provided with rubber-bushed bearings 59 at their upper and lower ends for mounting on pivots 11 and 15, whereby the links are permitted pivotal movement about axes extending longitudinally of the truck.

For permitting relative lateral movement between the yokes 9 and the equalizing beams 16 supported therefrom, a second modification is shown in FIGURES 7 and 8 in which the associated elements except for the links and their pivot mountings are similar to those illustrated in FIGURES 4 and 5. In this embodiment, however, sleeves 61 and 62 are respectively journaled on the upper and lower pivot pins 11 and 15 and are formed respectively with upwardly and downwardly facing saddles 64 and 65, in which are seated the similarly convex end portions of chain-type links 66. It will be evident from the foregoing that the upper and lower connections of links 66 are capable of limited pivoting about axes extending longitudinally of the truck to accommodate relative lateral movement between the yoke 9 and the supported equalizers 16.

Operation of the truck is as follows:

During operation oven tangent track, the general configuration of the truck and the relationship of the parts thereof will be substantially as shown in the drawings. Because of the location of the center plate at substantially the mid-point of the truck longitudinally, the body load will be distributed in substantially equal proportions to the four axles. In the event of vertical irregularities in the track structure, the distribution of the load to the axles will not be disturbed, the integrated equalizing systems at each side each functioning as a unit in their support of the frame from the driving axles, and the single point of support of the end of the frame on the sub-truck center plate cooperating with the equalizing systems to oppose excessive longitudinal tilting of the frame but permitting such slight transverse tilting as may be required by the independent action of the equalizing systems at the opposite sides. By this arrangement any of the usual combinations of vertical movements of the wheels relative to each other and to the main truck frame can be accommodated without requiring deflection of the springs by which the main frame is supported from the axles, and hence without varying the proportion of the load transmitted by the individual springs to the axles. The equalizer springs' function is primarily to provide vertical cushioning for the truck frame, without regard to equalization, and secondarily to absorb some of the energy resulting from the frequent movements of the equalizers "induced by track irregularities."

For example, assume the truck shown in FIGURES 1 and 2 to be moving forward, i.e., from left to right on track which is perfectly smooth except for a low joint in the right hand rail. When the right hand wheel 5 of the sub-truck reaches the low joint, it drops into the depression in the rail surface. When this occurs the sub-truck center plate 27 drops a distance equal to half the depth of the rail depression, and the main truck frame tilts about a transverse fulcrum vertically aligned with the middle driving axle. This tilting does not require any deflection of the equalizer springs 20, since the equalizers 16 are free to move counterclockwise about the bases of their springs 20 and their movements are equal because of their interconnection through yoke 9. As soon as wheel 5 passes the low joint, the truck parts return to their normal configuration, as shown in the drawings. When the right hand leading driving wheel 1 reaches the low joint, it drops into the depression and the forward equalizer accordingly moves clockwise about its spring base, causing counterclockwise movement of yoke 9 about its seat on the middle axle box, and corresponding clockwise rotation of the rear equalizer about its spring base. Because these movements do not require deflection of the equalizer springs 20, due to the interconnection of the equalizers by the yoke 9, there will be no variation in the distribution of load to the axles. This movement will however cause a slight lowering of the right side of the frame relative to the normal height of the center plate of the sub-track and the left side of the frame, but since the frame is supported on the sub-truck on its longitudinal center line, and the longitudinal center line of the main truck frame over the middle driving axle would be lowered only half the distance the right hand side was lowered, this would cause a slight longitudinal tilt of the frame, which would be compensated for by the equalizers at both sides without disturbing the load distribution, the forward equalizers moving upwardly, and because of the yoke interconnection, the rear equalizers moving a corresponding distance downwardly, thus maintaining the equalizer springs at both sides at their normal height. When the forward driving axle passes the low joint, the truck parts will return to their normal configuration as shown in the drawings, and will remain so until the middle driving wheel drops into the rail depression. When this occurs, both the forward and rear equalizers at the right hand side will pivot about the bases of their springs, counterclockwise and clockwise, respectively, causing the right hand side of the frame to lower slightly on the forward and rear driving axles, but not causing the equalizer springs to deflect. As described above, this will cause a slight longitudinal tilting of the frame, which will be compensated for by movement of the equalizer at both sides, without disturbing the load distribution to the axles. When the right rear driving wheel drops into the rail depression, the operation of the truck will be similar to the situation described above when the forward driving wheel was lowered. In all cases, the sub-truck cooperates with the equalizing systems by preventing excessive tilting of the frame on the equalizers which could occur in the absence of the end support of the frame or the tub-truck, and, since it supports the truck frame solely at one point, on the longitudinal center line, it offers no interference to the separate operation of the equalizing systems at each side. When the locomotive enters a curved track section, the rails, acting through the flanges of the sub-truck wheels 5, cause that truck to move transversely inwardly of the curve relative to the main truck frame, so that the outer radius rod 48 approaches a direction longitudinal of the main truck frame and the inner radius rod increases its angularity with the longitudinal direction of the main truck frame, thus respectively lengthening and shortening the longitudinal distance at each side between the transom 41 of the sub-truck and the forward transom 33 of the main truck frame with the result that the leading truck frame is shifted transversely inwardly of the main frame and its axle is substantially radial of the track. Since bolster 42 of the sub-trunk is pivoted to, but not movable laterally of the forward end 31 of the main frame, bolster 42 will move laterally of the leading truck frame rockers 43, which will urge sub-frame 37 downwardly, compressing springs 35, which will then through rockers 43, apply a centering force urging the bolster towards its normal position, that is, centered transversely of the leading truck. Because of the pivot connection between the sub-truck bolster and the forward end of the main truck frame this action of the sub-truck bolster 42 will urge the forward end of the main truck frame inwardly transversely of the track and will thus reduce, if not remove, the transverse load applied to the outer rail by the flange of the outer leading driving wheel 1.

With respect to the two modifications of the equalizing system shown in FIGURES 4–6 and FIGURES 7 and 8, respectively, when during curved track operation the middle axle is caused to move laterally relative to the two end axles, yokes 9 will move a corresponding distance laterally, but their lateral movements will not be transmitted to the equalizers 16, which are restrained against lateral movement by the engagement of their ends with the adjacent portions of the middle pedestal legs, the relative lateral movement between the yoke 9 and the equalizers 16 being accommodated by the rubber bushings 59, in FIGURE 5, or the link connection 64—65 in FIGURE 8.

The structural features of the invention may be varied otherwise than as shown without departing from the spirit of the invention, and the exclusive use of those modifications as come within the scope of the appended claims is contemplated.

What is claimed is:

1. A railway vehicle truck comprising three wheel and axle assemblies spaced apart longitudinally of the truck and in parallel relation with each other, said assemblies being relatively movable vertically but fixed against relative movement longitudinally of the truck, another wheel and axle assembly at one end of the truck positioned longitudinally outwardly from said first-named assemblies, said other assembly being movable vertically and radially relative to said first-named assemblies, an equalizing system at each side of the truck including a longitudinally extending yoke pivotally supported on the middle fixed assembly, substantially upright links pivotally supported on the end portions of said yoke, longitudinally extending beams pivotally supported on said end fixed assemblies and pivotally supported from said links, springs carried by said beams intermediate said middle and end fixed assemblies, and a truck frame supported at each side on said springs and at the middle of one of its ends on said other assembly, said equalizing systems each forming a single transverse fulcrum support for said frame spaced longitudinally of the truck from the support of the frame on said other assembly.

2. A railway vehicle truck according to claim 1, in which traction motors are supported in part on and connected with said fixed assemblies and are each supported in part from the truck frame in the same direction longitudinally of the truck, respectively, from their respective fixed assemblies.

3. A railway vehicle truck according to claim 2, in which the support of each of said traction motors from said frame is in the direction of said other assembly from said fixed assemblies.

4. A railway vehicle truck according to claim 1, in which a pair of laterally-spaced substantially horizontal bars are pivotally connected on laterally-spaced vertical axes to said other assembly and are inclined laterally inwardly rearwardly therefrom, the rear ends of said bars being pivotally connected on laterally spaced vertical axes to said frame whereby to permit radial movements of said other assembly relative to said fixed assemblies.

5. A railway vehicle truck according to claim 1 in which the support of said frame on said radially movable assembly includes a sub-frame spring-supported on said radially movable assembly, a bolster supported from said sub-frame by said centering device, and means restraining said bolster against lateral movement relative to said frame.

6. A railway vehicle truck according to claim 5 in which said means comprises a pair of mating, load-supporting pivot center plates on said frame and said bolster, respectively.

7. A railway vehicle truck according to claim 4 in which the support of said main frame on said radially movable assembly includes a sub-frame spring supported on said radially movable assembly, a bolster supported from said sub-frame by said lateral centering device, mating spherical center plates on said bolster and said frame, the pivotal connections of said bars to one of said frames accommodating limited angling of said bars in the planes of the axes of said pivotal connections.

8. A railway vehicle truck according to claim 1 including a pair of spaced longitudinally-extending side members converging at one end of the truck, the support of said frame on said radially-movable assembly being at the point of convergence of said frame side members.

9. In a railway vehicle truck having three wheel and axle assemblies, a yoke pivotally supported from each end of the middle assembly on an axis extending transversely of the truck, links pivotally depending from the ends of said yokes, beams each supported at one end from said depending links and extending longitudinally of the truck therefrom toward said end assemblies and supported at their remote ends from said end assemblies, upright springs carried by said beams, and a truck frame including longitudinally extending side members supported on said springs.

10. In a railway vehicle truck according to claim 9, said yokes and beams being disposed at either side of the truck in laterally-spaced pairs inside and outside of said longitudinal frame side members.

11. In a railway vehicle truck according to claim 9, upright snubbers positioned adjacent said springs and connected to said frame and said beams.

12. In a railway vehicle truck according to claim 10, said frame side members being formed with longitudinally spaced depending pedestal legs embracing the ends of said middle assembly, journal boxes rotatably mounted on the ends of said assembly and vertically slidably received between said spaced pedestal legs, said yokes being pivotally seated on the tops of said boxes, transverse pivot elements extending between the ends of the yokes at each side of the truck, said depending links being supported on said pivot elements and extending downwardly between said pairs of beams, and second pivot elements extending transversely between said pairs of beams and pivotally supporting said pairs of beams from said depending links, spring seats supported between said laterally spaced pairs of beams at each side of the truck, said upright springs being seated thereon.

13. In a railway vehicle truck according to claim 12, said beams having end portions in alignment transversely of the truck with the adjacent pedestal legs, said links being arranged for limited pivoting in planes transversely as well as longitudinally of said truck.

14. In a railway vehicle truck according to claim 13, the arrangement of said links for pivoting in planes transversely of the truck comprising a rubber bushing surrounding said pivot elements.

15. In a railway vehicle truck according to claim 13, the arrangement of said links for limited pivotal movement in planes transversely of the truck comprising saddle elements carried by said pivot elements and arcuately recessed longitudinally of the truck, said links including arcuate surfaces pivotally received within the recesses of said saddle elements.

References Cited in the file of this patent

UNITED STATES PATENTS

| | | |
|---|---|---|
| 1,512,599 | Hedgecock | Oct. 21, 1924 |
| 1,775,337 | Woodard | Sept. 9, 1930 |
| 1,995,525 | Travilla | Mar. 26, 1935 |
| 2,116,295 | Woodard | May 3, 1938 |
| 2,402,711 | Travilla | June 25, 1946 |
| 2,474,012 | Pelager | June 21, 1949 |
| 2,592,637 | Ainsworth | Apr. 15, 1952 |
| 2,728,304 | Applegate | Dec. 27, 1955 |
| 2,797,649 | Ross et al. | July 2, 1957 |